United States Patent
Yu et al.

(10) Patent No.: US 9,696,473 B2
(45) Date of Patent: Jul. 4, 2017

(54) LAMINATE, METHOD FOR PREPARING THIN POLARIZER BY USING SAME, THIN POLARIZER, AND POLARIZING PLATE

(71) Applicant: LG CHEM, LTD., Seoul (KR)

(72) Inventors: Hye Min Yu, Daejeon (KR); Sung Hyun Nam, Daejeon (KR); Kyun Il Rah, Daejeon (KR); Jonghyun Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/031,952

(22) PCT Filed: Oct. 21, 2014

(86) PCT No.: PCT/KR2014/009903
§ 371 (c)(1),
(2) Date: Apr. 25, 2016

(87) PCT Pub. No.: WO2015/064946
PCT Pub. Date: May 7, 2015

(65) Prior Publication Data
US 2016/0266291 A1    Sep. 15, 2016

(30) Foreign Application Priority Data
Oct. 31, 2013   (KR) .................. 10-2013-0131592

(51) Int. Cl.
*G02B 5/30* (2006.01)
*B32B 7/02* (2006.01)
*B32B 27/08* (2006.01)
*B32B 27/30* (2006.01)
*B32B 27/40* (2006.01)

(52) U.S. Cl.
CPC ............... *G02B 5/305* (2013.01); *B32B 7/02* (2013.01); *B32B 27/08* (2013.01); *B32B 27/306* (2013.01); *B32B 27/40* (2013.01); *G02B 5/3033* (2013.01); *B32B 2551/00* (2013.01)

(58) Field of Classification Search
None
See application file for complete search history.

(56) References Cited

U.S. PATENT DOCUMENTS

2005/0019505 A1*   1/2005   Hamamoto .......... G02B 5/3033
                                                                 428/1.31
2006/0098137 A1    5/2006   Kameyama et al.
(Continued)

FOREIGN PATENT DOCUMENTS

EP    2613183 A1    7/2013
JP    2000-338329 A    12/2000
(Continued)

OTHER PUBLICATIONS

International Search Report from PCT/KR2014/009903, dated Feb. 26, 2015.
(Continued)

*Primary Examiner* — Tahseen N Khan
(74) *Attorney, Agent, or Firm* — Dentons US LLP (57) ABSTRACT

The present invention relates to a laminate including an unstretched polymer film; and an unstretched polyvinyl alcohol-based film attached to at least one surface of the polymer film, and a preparing method for a thin polarizer using the laminate.

11 Claims, 1 Drawing Sheet

(56) References Cited

U.S. PATENT DOCUMENTS

| | | |
|---|---|---|
| 2007/0286969 A1 | 12/2007 | Nagpal et al. |
| 2011/0315306 A1 | 12/2011 | Goto et al. |
| 2012/0281279 A1 | 11/2012 | Goto et al. |
| 2012/0327512 A1 | 12/2012 | Goto et al. |
| 2013/0070186 A1 | 3/2013 | Kunai |
| 2013/0100529 A1* | 4/2013 | Kitagawa ............. B29C 55/026 359/487.01 |
| 2013/0128357 A1 | 5/2013 | Izaki et al. |
| 2013/0135725 A1 | 5/2013 | Mori et al. |
| 2015/0301252 A1 | 10/2015 | Nam et al. |

FOREIGN PATENT DOCUMENTS

| | | |
|---|---|---|
| JP | 2004-272078 A | 9/2004 |
| JP | 2005-104048 A | 4/2005 |
| JP | 2007-534007 A | 11/2007 |
| JP | 2008-127401 A | 6/2008 |
| JP | 2009-116103 A | 5/2009 |
| JP | 2012-032834 A | 2/2012 |
| JP | 2012-133303 A | 7/2012 |
| JP | 2013-011837 A | 1/2013 |
| JP | 2013-011838 A | 1/2013 |
| KR | 2011-0010147 A | 1/2011 |
| KR | 2011-0118825 A | 11/2011 |
| KR | 2012-0104289 A | 9/2012 |
| KR | 2013-0108276 A | 10/2013 |
| TW | 200401909 A | 2/2004 |
| WO | 2005-079233 A2 | 9/2005 |
| WO | 2010-100917 A1 | 9/2010 |
| WO | 2014-077636 A1 | 5/2014 |

OTHER PUBLICATIONS

Written Opinion of the ISA from PCT/KR2014/009903, dated Feb. 26, 2015.

Office Action of Korean Patent Office in Appl'n No. 10-2014-0142451 dated Nov. 19, 2015.

Office Action of Korean Patent Office in Appl'n No. 10-2014-0142451 dated May 31, 2016.

Office Action of Taiwanese Patent Office in Appl'n No. 103136228 dated Sep. 8, 2015.

\* cited by examiner

Figure 1

Figure 2

LAMINATE, METHOD FOR PREPARING THIN POLARIZER BY USING SAME, THIN POLARIZER, AND POLARIZING PLATE

TECHNICAL FIELD

This application is a National Stage Entry of International Application No. PCT/KR2014/009903, filed on Oct. 21, 2014, and claims the benefit of and priority to Korean Application No. 10-2013-0131592, filed on Oct. 31, 2013, both of which are incorporated herein by reference in their entirety for all purposes as if fully set forth herein.

The present invention relates to a laminate, a preparing method for a thin polarizer using the same, and a thin polarizer and a polarizing plate prepared by using the same, and more particularly, to a laminate used in order to prepare a thin polarizer which is easily peeled off from a base material and has excellent optical properties, a preparing method for a thin polarizer using the laminate, and a thin polarizer and a polarizing plate.

BACKGROUND ART

A polarizer used for a polarizing plate is an optical device for converting natural light or any polarized light into polarized light having a certain direction, and has been widely used for a display device such as a liquid crystal display device and an organic light emitting device (OLED). Currently, as a polarizer used for the display device, a polyvinyl alcohol-based polarizing film, in which molecular chains containing an iodine-based compound or a dichroic dye are aligned in a predetermined direction, has been generally used.

The polyvinyl alcohol-based polarizing film is prepared by a method in which a polyvinyl alcohol-based film is dyed with iodine or a dichroic dye and then stretched in a predetermined direction and cross-linked, and in this case, the stretching process may be performed in the form of wet stretching performed in a solution such as a boric acid aqueous solution or an iodine aqueous solution or dry stretching performed under air, and the stretching ratio is generally five times or more.

However, in the preparation process in the related art as described above, it is required that the thickness of an unstretched polyvinyl alcohol-based film exceed 60 μm for the stretching to be performed without causing breakage. The reason is because when the unstretched polyvinyl alcohol-based film has a thickness of 60 μm or less, the degree of swelling of the polyvinyl alcohol-based film is increased, and modulus acting per unit area in the stretching process is increased due to the small thickness, thereby easily causing breakage.

Meanwhile, it is required that the polarizing plate also has a smaller thickness according to the recent trend that display devices have become thin. However, when a polyvinyl alcohol-based film having an unstretched thickness more than 60 μm as in the related art is used, there is a limitation in reducing the thickness of the polarizer. Therefore, studies for preparing a polarizer having a smaller thickness have been made.

For example, Korean Patent Application Laid-Open No. 2010-0071998 discloses a method for preparing a thin polarizing plate using a laminate prepared by coating a hydrophilic polymer layer on a base material layer, or co-extruding a material for forming a base material layer and a material for forming a hydrophilic polymer layer. However, in the case of a coating method or a co-extrusion method, since it is not easy to separate a polyvinyl alcohol layer and a base material layer after stretching and a high peel strength is required for separation, a problem in that a polyvinyl alcohol layer is damaged or deformed during the separation process easily occurs, and as a result, there is a problem in that optical properties such as the degree of polarization of a polyvinyl alcohol film deteriorate, and also, physical properties of a polyvinyl alcohol film prepared according to extrusion conditions, coating conditions or film-forming conditions are easily changed, so that there is a problem in that physical properties of polyvinyl alcohol finally prepared deteriorate and it is difficult to implement uniform physical properties.

DISCLOSURE

Technical Problem

The present invention has been made in an effort to provide a laminate used for preparing a polyvinyl alcohol-based thin polarizer which is easily peeled off and excellent in optical properties and has a thickness of 10 μm or less, which is thin, a preparing method for a thin polarizer using the laminate, and a thin polarizer and a polarizing plate.

Technical Solution

In an aspect, the present invention provides a laminate including: an unstretched polymer film; and an unstretched polyvinyl alcohol-based film attached to at least one surface of the polymer film, in which the laminate satisfies the following Equations (1) and (2).

$$5 \leq \frac{E_{sub'}}{d_{sub'}} \leq 70 \quad \text{Equation (1)}$$

$$0.7 \leq \frac{\left(\frac{E_{PVA}}{d_{PVA}}\right)}{\left(\frac{E_{sub'}}{d_{sub'}}\right)} \leq 1.3 \quad \text{Equation (2)}$$

In Equations (1) and (2), $E_{sub'}$ is the modulus of a polymer film, $d_{sub'}$ is the thickness of the polymer film, $E_{PVA}$ is the modulus of a polyvinyl alcohol-based film, and $d_{PVA}$ is the thickness of the polyvinyl alcohol-based film. In this case, it is preferred that the modulus of the polymer film is 50 MPa to 4,000 MPa, and the thickness of the film is 20 to 100 μm.

Further, it is preferred that the modulus of the polyvinyl alcohol-based film is 50 MPa to 4,000 MPa, and the thickness of the film is 10 to 60 μm.

Meanwhile, the present invention also provides a stretched laminate prepared by stretching the laminate by 5 to 15 times at a temperature of 20° C. to 85° C.

In another aspect, the present invention provides a preparing method for a thin polarizer, the method including: forming a laminate which satisfies the following Equations (1) and (2) by attaching an unstretched polyvinyl alcohol-based film to at least one surface of an unstretched polymer film; and forming a stretched laminate by stretching the laminate.

$$5 \leq \frac{E_{sub'}}{d_{sub'}} \leq 70 \quad \text{Equation (1)}$$

$$0.7 \le \frac{\left(\frac{E_{PVA}}{d_{PVA}}\right)}{\left(\frac{E_{sub'}}{d_{sub'}}\right)} \le 1.3 \qquad \text{Equation (2)}$$

In Equations (1) and (2), $E_{sub'}$ is the modulus of a polymer film, $d_{sub'}$ is the thickness of the polymer film, $E_{PVA}$ is the modulus of a polyvinyl alcohol-based film, and $d_{PVA}$ is the thickness of the polyvinyl alcohol-based film.

Meanwhile, it is preferred that the polymer film and the polyvinyl alcohol-based film are attached to each other by using a weak attractive force on the surfaces of the films or an adhesive.

Meanwhile, it is preferred that the stretching is performed at a stretching ratio of 5 times to 15 times at a temperature of 20° C. to 85° C.

In addition, it is preferred that the stretching is performed in a boric acid aqueous solution at a boric acid concentration of 1 wt % to 5 wt %.

Meanwhile, the preparing method for a thin polarizer of the present invention may further include dyeing at least one of iodine and a dichroic dye to the laminate prior to forming the stretched laminate.

Furthermore, the preparing method for a thin polarizer of the present invention may further include separating a polyvinyl alcohol-based film after forming the stretched laminate from a polymer film.

In this case, it is preferred that the separating of the polyvinyl alcohol-based film from the polymer film is performed by applying a peel strength of 2 N/2 cm or less.

Meanwhile, the present invention provides a thin polarizer which has a thickness of 10 μm or less and satisfies the following Equation (3).

$$DOP > -0.3179 Ts^2 + 26.012 Ts - 432.12 \qquad \text{Equation (3):}$$

In Equation (3), DOP is a degree of polarization, Ts is a single transmittance, and in this case, Ts satisfies the relationship 0.400<Ts<0.427.

Further, the present invention provides a polarizing plate including the thin polarizer.

Advantageous Effects

According to the present invention, it is possible to prepare a polyvinyl alcohol-based thin polarizer which has a thickness of 10 μm or less, which is very thin, and is excellent in optical properties. In particular, the thin polarizer generally has optical properties that the degree of polarization is increased when the single transmittance is decreased, and the degree of polarization is decreased when the single transmittance is increased, but the thin polarizer according to the present invention is advantageous in that the polarizer may have excellent optical properties that both degree of polarization and single transmittance are high compared to the thin polarizer in the related art.

Meanwhile, in the case of the present invention, process stability during the stretching process is also excellent, such as the ability to minimize the damage to the surface during the separation process after stretching without separating a polymer film and a polyvinyl alcohol-based film during the stretching process.

MODE FOR INVENTION

Hereinafter, preferred embodiments of the present invention will be described. However, embodiments of the present invention may be modified in various forms, and the scope of the present invention is not limited to the embodiments which will be described below. Further, embodiments of the present invention are provided such that a person with ordinary skill in the art may more completely understand the present invention.

First, a laminate to be used for the preparation of the thin polarizer of the present invention will be described.

The laminate of the present invention is characterized to include: an unstretched polymer film; and an unstretched polyvinyl alcohol-based film attached to at least one surface of the polymer film, and satisfy the following Equations (1) and (2).

$$5 \le \frac{E_{sub'}}{d_{sub'}} \le 70 \qquad \text{Equation (1)}$$

$$0.7 \le \frac{\left(\frac{E_{PVA}}{d_{PVA}}\right)}{\left(\frac{E_{sub'}}{d_{sub'}}\right)} \le 1.3 \qquad \text{Equation (2)}$$

In Equations (1) and (2), $E_{sub'}$ is the modulus of a polymer film, $d_{sub'}$ is the thickness of the polymer film, $E_{PVA}$ is the modulus of a polyvinyl alcohol-based film, and $d_{PVA}$ is the thickness of the polyvinyl alcohol-based film.

First, Equation (1) means a ratio of modulus to thickness of an unstretched polymer film, and the ratio of modulus to thickness of the unstretched polymer film is preferably in a range of 5 to 70, and more preferably 10 to 60. Further, Equation (2) means a ratio of the ratio of modulus to thickness of the unstretched polyvinyl alcohol-based film to the ratio of modulus to thickness of the unstretched polymer film, and the ratio of the ratio of modulus to thickness of the unstretched polyvinyl alcohol-based film to the ratio of modulus to thickness of the unstretched polymer film is preferably 0.7 to 1.3, and more preferably 0.8 to 1.2.

The present invention is characterized to satisfy the Equations (1) and (2), and when a thin polarizer is prepared by using the laminate which satisfies the Equations (1) and (2), it is possible to prepare a thin polarizer having excellent optical properties, which is better in process stability, and furthermore, has higher degree of polarization and single transmittance than the case that fails to satisfy the Equations. More specifically, when the laminate fails to satisfy Equations (1) and (2), there may occur a problem in that the polyvinyl alcohol-based film is inhibited from being uniaxially stretched by the polymer film, plane stretching is induced and the like during the preparation process because stretching behaviors of the polymer film and the polyvinyl alcohol-based film are different from each other, and as a result, there may occur a problem in that the alignment of iodine in a polarizer is interrupted, thereby leading to deterioration in optical properties. In addition, when the stretching process is performed in an actual pilot scale, the probability that the film will break is increased.

Meanwhile, the modulus (Young's Modulus) in the present invention refers to a value obtained by fixing both ends of a sample prepared in accordance with the standard of JIS-K6251-1, applying force to a direction vertical to the thickness direction of the film, and measuring stress per unit area according to the strain, and in this case, for example, a tensile strength meter (Zwick/Roell 2010 UTM) and the like may be used as a measuring apparatus.

In addition, the thickness in the present invention may be measured by a well-known method in the art to which the present invention pertains, and may be measured by using, for example, a thickness measurement device (TESA Mu-hite Electronic Height Gauge 100 mm).

Next, the polymer film to be included in the laminate of the present invention is to prevent a polyvinyl alcohol-based film during the stretching process from being broken, and the polymer film of the present invention may be used without particular limitation as long as the film may satisfy Equations (1) and (2). For example, it is possible to use a polymer film including one or more selected from the group consisting of a thermoplastic polyurethane-based resin, a low-density polyethylene-based resin, a high-density polyethylene-based resin, a copolymer resin which contains ethylene vinyl acetate in a high-density polyethylene, a polypropylene-based resin, a polyethylene terephthalate-based resin containing isophthalic acid, an acryl-based resin and a water-soluble cellulose-based resin as the polymer film which satisfies Equations (1) and (2).

Meanwhile, the polymer film is not limited thereto, but it is more preferred that the polymer film includes particularly a thermoplastic polyurethane-based resin among them. This is because when the polymer film includes a thermoplastic polyurethane-based resin, a smooth width shrinkage may be induced without suppressing the width shrinkage of the polyvinyl alcohol-based film stretched during the drying process due to heat shrinkage properties of the polymer film, which are similar to those of a polyvinyl alcohol-based film, and thus the alignment property of a polyvinyl alcohol-iodine complex may be further enhanced. According to an exemplary embodiment of the present invention, the polymer film includes a thermoplastic polyurethane-based resin.

Meanwhile, the modulus of the polymer film may be in a range of 50 MPa to 4,000 MPa, and preferably in a range of 100 MPa to 3,000 MPa. When the modulus of the polymer film is less than 50 MPa, rigidity of the film may deteriorate, thereby causing process instability such as break, and when the modulus exceeds 4,000 MPa, it may be difficult to achieve high ratio stretching because strong force is required during the stretching, and thus stretching property deteriorates.

Furthermore, the thickness of the polymer film may be in a range of 20 μm to 100 μm, preferably in a range of 30 μm to 80 μm. When the thickness of the polymer film is less than 20 μm, a polyvinyl alcohol-based film fails to be sufficiently supported when a laminate structure is formed to perform the stretching process, thereby causing a problem such as breakage in the process, and when the thickness exceeds 100 μm, the modulus is increased and stretching property deteriorates, and the polyvinyl alcohol-based film may also be hindered from freely shrinking in width at the drying interval, thereby suppressing optical properties of a polarizer finally obtained.

Next, the polyvinyl alcohol-based film attached to at least one surface of the polymer film is used as a polyvinyl alcohol-based thin polarizer after being subjected to stretching and dyeing processes and the like, and the polyvinyl alcohol-based film may be used without special limitation as long as the film may satisfy the Equation (2) and includes a polyvinyl alcohol resin or a derivative thereof. In this case, examples of the derivative of the polyvinyl alcohol resin include, but are not limited to, a polyvinyl formal resin, a polyvinyl acetal resin and the like. Otherwise, as the polyvinyl alcohol-based film, it is also possible to use a polyvinyl alcohol-based film which may satisfy the Equation (2) as a commercially available polyvinyl alcohol-based film used in the preparation of a polarizer in the art, for example, M2001 and M2005 manufactured by Nippon Synthetic Chemical Industry Co., Ltd., PE20 manufactured by Kurary Co., Ltd., and the like.

Meanwhile, the modulus of the polyvinyl alcohol-based film may be in a range of 50 MPa to 4,000 MPa, and preferably in a range of 100 MPa to 3,000 MPa. When the modulus of the polyvinyl alcohol-based film is less than 50 MPa, rigidity of the film may deteriorate, thereby causing process instability such as breakage, and when the modulus exceeds 4,000 MPa, it may be difficult to achieve high ratio stretching because strong force is required during the stretching, and thus stretching property deteriorates.

Further, the thickness of the polyvinyl alcohol-based film may be in a range of 10 μm to 60 μm, preferably in a range of 10 μm to 40 μm. When the thickness of the polyvinyl alcohol-based film is less than 10 μm, there may cause a problem such as breakage easily occurs when a laminate structure is formed to perform the stretching process, and when the thickness exceeds 60 μm, the thickness of a polarizer finally obtained becomes too thick to be suitable for the preparation of a thin polarizer having a thickness of 10 μm or less.

Meanwhile, the degree of polymerization of the polyvinyl alcohol-based film may be in a range of 1,000 to 10,000, preferably, in a range of 1,500 to 5,000, but is not limited thereto. When the degree of polymerization satisfies the range, molecules thereof freely move, and the polyvinyl alcohol-based film may be flexibly mixed with iodine or a dichroic dye, and the like.

Hereinafter, a preparing method for a thin polarizer of the present invention will be described.

The preparing method for a thin polarizer of the present invention is characterized to include: forming a laminate which satisfies the following Equations (1) and (2) by attaching an unstretched polyvinyl alcohol-based film to at least one surface of an unstretched polymer film; and forming a stretched laminate by stretching the laminate.

$$5 \leq \frac{E_{sub'}}{d_{sub'}} \leq 70 \quad \text{Equation (1)}$$

$$0.7 \leq \frac{\left(\frac{E_{PVA}}{d_{PVA}}\right)}{\left(\frac{E_{sub'}}{d_{sub'}}\right)} \leq 1.3 \quad \text{Equation (2)}$$

In Equations (1) and (2), $E_{sub'}$ is the modulus of a polymer film, $d_{sub'}$ is the thickness of the polymer film, $E_{PVA}$ is the modulus of a polyvinyl alcohol-based film, and $d_{PVA}$ is the thickness of the polyvinyl alcohol-based film.

First, in the present invention, the polymer film may be attached to the polyvinyl alcohol-based film by a weak attractive force without a separate medium, and in this case, the peeling strength may be 2 N/2 cm or, preferably, in a range of 0.1 N/2 cm to 1 N/2 cm. When the peeling strength satisfies the range, the range is preferred because the polymer film and the polyvinyl alcohol-based film are not separated during the stretching process, and surface damage may be minimized during the separation process after the stretching.

Figure 1:
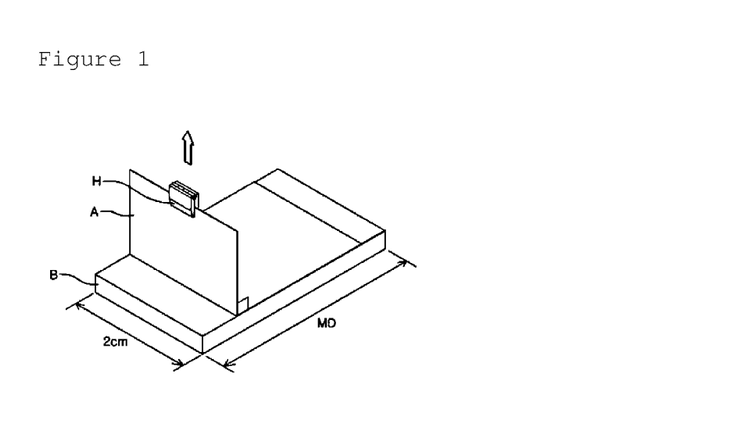
FIG. 1 is a schematic view illustrating a method of measuring peeling strength using a texture analyzer.

Meanwhile, the peeling strength is a peeling strength measured when sample films having a width of 2 cm are attached to each other, and more specifically, the peeling strength refers to a peel strength measured by fixing a polyvinyl alcohol-based film (A) of a laminate on a sample holder (H), and then applying force in a direction vertical to a surface direction of the laminate while peeling-off the polyvinyl alcohol-based film (A) from a polymer film (B) as illustrated in the following [FIG. 1], and in this case, for example, Texture Analyzer (model name: TA-XT Plus) manufactured by Stable Micro Systems, Ltd., may be used as a measuring apparatus.

Meanwhile, in order to enhance peeling strength of the polymer film and the polyvinyl alcohol-based film, a surface treatment may be performed on one surface or both surfaces of the polymer film or the polyvinyl alcohol-based film. In this case, the surface treatment may be performed through various surface treatment methods well known in the art, for example, corona treatment, plasma treatment, or surface modification treatment using a strong base aqueous solution such as NaOH or KOH, and the like.

Furthermore, in the present invention, the polymer film may also be attached to the polyvinyl alcohol-based film using an adhesive. When the base film is attached to the polyvinyl alcohol-based film by using an adhesive, the thickness of the adhesive layer is preferably in a range of 20 nm to 4,000 nm. When the thickness of the adhesive layer satisfies the range, the range is advantageous in peeling off the polyvinyl alcohol-based film without being damaged after the stretching and drying processes.

Meanwhile, the peeling strength (adhesive force) of the adhesive may be 2 N/2 cm or less, preferably, in a range of 0.1 N/2 cm to 1 N/2 cm, the material of the adhesive is not particularly limited, and various adhesives known in the art may be used without limitation. For example, the adhesive layer may be formed by a water-based adhesive or a UV-curable adhesive.

More specifically, the adhesive layer may be formed by a water-based adhesive including one or more selected from the group consisting of a polyvinyl alcohol-based resin, an acryl-based resin and a vinyl acetate-based resin. Furthermore, the adhesive layer may be formed by a water-based adhesive including a polyvinyl alcohol-based resin having an acrylic group and a hydroxyl group. In this case, the degree of polymerization of the polyvinyl alcohol-based resin having an acrylic group and a hydroxyl group may be in a range of 500 to 1,800. When the water-based adhesive as described above is used, the thickness of the adhesive layer is preferably in a range of 20 nm to 1,000 nm.

Meanwhile, the adhesive layer may also be formed by a UV-curable adhesive, and may be, for example, formed by a UV-curable adhesive including a first epoxy compound in which the glass transition temperature of the homopolymer is 120° C. or more, a second epoxy compound in which the glass transition temperature of the homopolymer is 60° C. or less, and a cationic photopolymerization initiator. Specifically, the UV-curable adhesive may include 100 parts by weight of the first epoxy compound in which the glass transition temperature of the homopolymer is 120° C. or more, 30 to 100 parts by weight of the second epoxy compound in which the glass transition temperature of the homopolymer is 60° C. or less, and 0.5 to 20 parts by weight of the cationic photopolymerization initiator.

In the present specification, the epoxy compound refers to a compound having one or more epoxy groups in a molecule thereof, preferably, a compound having two or more epoxy groups in a molecule thereof, and is a concept that includes all of the compounds in the form of a monomer, a polymer or a resin. Preferably, the epoxy compound of the present invention may be in the form of a resin.

Meanwhile, the first epoxy compound may be used without special limitation as long as the compound is an epoxy compound in which the glass transition temperature of the homopolymer is 120° C. or more, and for example, an alicyclic epoxy compound and/or an aromatic epoxy in which the glass transition temperature of the homopolymer is 120° C. or more may be used as the first epoxy compound of the present invention. Specific examples of the epoxy compound in which the glass transition temperature of the homopolymer is 120° C. or more include 3,4-epoxycyclohexylmethyl-3,4'-epoxycyclohexane carboxylate, vinylcyclohexene dioxide, dicyclopentadiene dioxide, bis epoxy cyclopentyl ether, a bisphenol A-based epoxy compound, a bisphenol F-based epoxy compound and the like. Meanwhile, the first epoxy compound is more preferably an epoxy compound in which the glass transition temperature of the homopolymer is in a range of 120° C. to 200° C.

Further, the second epoxy compound may be used without particular limitation as long as the compound is an expoxy compound in which the glass transition temperature of the homopolymer is 60° C. or less. For example, an alicyclic epoxy compound, an aliphatic epoxy compound and the like may be used as the second epoxy compound. Meanwhile, the second epoxy compound is more preferably an epoxy compound in which the glass transition temperature of the homopolymer is in a range of 0° C. to 60° C.

In this case, as the alicyclic epoxy compound, a bifunctional epoxy compound, that is, a compound having two epoxies is preferably used, and a compound in which both of the two epoxies are an alicyclic epoxy group is more preferably used, but the alicyclic epoxy compound is not limited thereto.

In addition, as the aliphatic epoxy compound, an epoxy compound having an aromatic epoxy group other than the alicyclic epoxy group may be exemplified. For example, a polyglycidyl ether of aliphatic polyhydric alcohol; a polyglycidyl ether of an alkylene oxide adduct of aliphatic polyhydric alcohol; a polyglycidyl ether of polyester polyol of aliphatic polyhydric alcohol and aliphatic polyvalent carboxylic acid; a polyglycidyl ether of aliphatic polyvalent carboxylic acid; a polyglycidyl ether of polyester polycarboxylic acid of aliphatic polyhydric alcohol and aliphatic polyvalent carboxylic acid; a dimer, oligomer or polymer obtained by vinyl polymerization of glycidyl acrylate or glycidyl methacrylate; or an oligomer or polymer obtained by vinyl polymerization of glycidyl acrylate or glycidyl methacrylate with a vinyl monomer other than the glycidyl acrylate or glycidyl methacrylate may be exemplified, and preferably, a polyglycidyl ether of aliphatic polyhydric alcohol or an alkylene oxide adduct thereof may be used, but the aliphatic epoxy compound is not limited thereto.

As the aliphatic polyhydric alcohol, for example, aliphatic polyhydric alcohols having 2 to 20, 2 to 16, 2 to 12, 2 to 8 or 2 to 4 carbon atoms may be exemplified, and for example, an aliphatic diol such as ethylene glycol, 1,2-propanediol, 1,3-propanediol, 2-methyl-1,3-propanediol, 2-butyl-2-ethyl-1,3-propanediol, 1,4-butanediol, neopentyl glycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5- heptanediol, 1,8-octanediol, 2-methyl-1,8-octanediol, 1,9-nonanediol and 1,10-decanediol; alicyclic diol such as cyclohexanedimethanol, cyclohexanediol, hydrogenated bisphenol A and hydrogenated bisphenol F; trimethylolethane, trimethylolpropane, hexitols, pentitols, glycerin, polyglycerin, pentaerythritol, dipentaerythritol, tetramethylolpropane and the like may be exemplified.

Furthermore, as the akylene oxide, alkylene oxides having 1 to 20, 1 to 16, 1 to 12, 1 to 8 or 1 to 4 carbon atoms may be exemplified, and for example, ethylene oxide, propylene oxide or butylenes oxide, and the like may be used.

Further, as the aliphatic polyvalent carboxylic acid, for example, oxalic acid, malonic acid, succinic acid, glutaric acid, adipic acid, pimelic acid, suberic acid, azelaic acid, sebacic acid, dodecane diacid, 2-methylsuccinic acid, 2-methyladipic acid, 3-methyladipic acid, 3-methylpentane diacid, 2-methyloctane diacid, 3,8-dimethyldecane diacid, 3,7-dimethyldecane diacid, 1,20-eicosamethylenedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 1,4-dicarboxylic methylenecyclohexane, 1,2,3-propanetricarboxylic acid, 1,2,3,4-butanetetracarboxylic acid, 1,2,3,4-cyclobutanetetracarboxylic acid and the like may be exemplified, but the aliphatic polyvalent carboxylic acid is not limited thereto.

Preferably, the second epoxy compound of the present invention may be a compound including one or more glycidyl ether groups, and for example, one or more selected from the group consisting of 1,4-cyclohexanedimethanol diglycidyl ether, 1,4-butanediol diglycidyl ether, 1,6-hexanediol diglycidyl ether, neopentyl diglycidyl ether, resorcinol diglycidyl ether, diethyleneglycol diglycidyl ether, ethyleneglycol diglycidyl ether, trimethylolpropane triglycidyl ether, n-butyl glycidyl ether, 2-ethylhexyl glycidyl ether, phenyl glycidyl ether, and o-cresyl glycidyl ether may be used as the second epoxy compound of the present invention.

Meanwhile, the present invention is not limited thereto, but in the case of the present invention, it is particularly preferred to use a combination of a first epoxy compound including one or more epoxidized aliphatic ring groups and a second epoxy compound including one or more glycidyl ether groups as the epoxy compound.

When a laminate is formed by attaching a polyvinyl alcohol-based film to a polymer film, the laminate is stretched. In this case, the stretching may be performed in the form of wet stretching. In this case, the surface peeling strength of the polymer film and the polyvinyl alcohol-based film becomes strong as compared to the dry stretching, so that stretching may be stably performed even though the polyvinyl alcohol-based film is attached on the polymer film without a separate adhesive means.

The stretching may be performed along with at least one step of dyeing iodine and/or a dichroic dye to a polyvinyl alcohol-based film and/or cross-linking the dyed iodine and/or dichroic dye to the polyvinyl alcohol-based film. In addition, the dyeing of iodine and/or the dichroic dye to the laminate may be performed prior to the stretching.

Furthermore, the stretching and the cross-linking of the iodine and/or dichroic dye to the polyvinyl alcohol film may be simultaneously performed by performing the stretching in a boric acid aqueous solution.

For example, the dyeing, cross-linking and stretching processes may be simultaneously performed by performing the stretching in an aqueous solution including iodine and/or a dichroic dye and boric acid. Further, after the dyeing is performed by immersing the laminate in an aqueous solution including iodine and/or a dichroic dye prior to the stretching, the cross-linking and the stretching may also be performed at the same time by immersing the laminate in which the dyeing has been completed in a boric acid aqueous solution, and performing the stretching in the boric acid aqueous solution.

Meanwhile, the process of preparing a polarization device generally includes the processes of washing, swelling, dyeing, cleaning, stretching, adding complementary colors, drying and the like, and in the present invention, it is preferred that cleaning and stretching processes are performed in a boric acid aqueous solution. More preferably, in the case of the washing process, the concentration of boric acid may be in a range of 0.1 wt % to 2.5 wt %, preferably 0.5 wt % to 2.0 wt %, and in the case of the stretching process, the concentration of boric acid may be 1.0 wt % to 5.0 wt %, preferably 1.0 wt % to 4.0 wt %, and more preferably, in a range of 1.5 wt % to 3.5 wt %. When the stretching is performed in the boric acid aqueous solution as described above, the breakage occurrence rate of the polyvinyl alcohol-based film deteriorates due to the cross-linking of boric acid, thereby enhancing process stability, and it is possible to control the amount of corrugation on the polyvinyl alcohol-based film, which is easily generated during the wet process. In addition, there is an advantage in that stretching may be performed even at low temperature as compared to the dry stretching.

Meanwhile, it is preferred that the stretching is performed such that the polyvinyl alcohol-based film has a thickness of 10 μm or less for making the polarizer thinner, and for example, it is preferred that the stretching is performed such that the polyvinyl alcohol-based film has a thickness in a range of 1 μm to 10 μm, or 3 μm to 10 μm.

In addition, the stretching is limited not to the following range, but it is particularly preferred in consideration of optical properties that the stretching is performed at a temperature of 20° C. to 85° C. at a stretching ratio of 5 to 15 times, preferably at a temperature of 40° C. to 80° C., and more preferably at a temperature of 45° C. to 55° C. at a stretching ratio of 5 to 10 times.

Furthermore, the stretching method is not particularly limited, and for example, the laminate may be uniaxially stretched with respect to the longitudinal direction (MD), or the laminate may also be uniaxially stretched with respect to the transverse direction (TD). Further, when the laminate is stretched in the transverse direction (TD), shrinkage in the longitudinal direction (MD) may also be caused simultaneously biaxially. Meanwhile, examples of a method of stretching the laminate in the transverse direction (TD) include a fixed-end uniaxial stretching method with one end fixed through a tenter, and examples of a method of stretching the laminate in the longitudinal direction (MD) include an inter-roll stretching method, a compression stretching method, a free-end uniaxial stretching method and the like. Meanwhile, the stretching processing may also be performed in multiple stages, or may also be conducted by performing biaxial stretching, inclined stretching and the like.

Meanwhile, the stretching may also be performed in the form of a dry stretching. That is, the laminate which satisfies Equations (1) and (2) of the present invention may be stretched even in the form of a dry stretching, and more specifically, the dry stretching may be performed at a low temperature of 20° C. to 80° C. at a stretching ratio in a range of 5 to 15 times.

Meanwhile, after the stretching, the drying of the stretched laminate may be performed if necessary. In this case, the drying is not limited to the following range, but it is preferred that the drying is performed at a temperature in a range of 20° C. to 100° C., more preferably 40° C. to 90° C. in consideration of optical properties of the polarizer, and the drying time is preferably in a range of 1 min to 10 min. The drying process serves to prevent deterioration in physical properties of a polyvinyl alcohol-based polarizer by moisture during the process of preparing a polarizing plate by removing moisture on the surface and the inside of polyvinyl alcohol and enhancing the degree of the polarizer by smoothly inducing width shrinkage of the polyvinyl alcohol-based film stretched during the drying process to enhance the alignment property of a complex composed of polyvinyl alcohol and iodine.

After the laminate is subjected to the processes as described above and then to the stretching treatment, the separating of the polyvinyl alcohol-based film from the polymer film may be additionally performed. The separation process may be performed by a method of leaving a polyvinyl alcohol-based film from a polymer film by applying a weak peel strength to the polyvinyl alcohol-based film. In this case, the peel strength is preferably 2 N/2 cm or less, and for example, may be in a range of 0.1 N/2 cm to 2 N/2 cm, or 0.1 N/2 cm to 1 N/2 cm. As described above, in the case of the present invention, since the peel strength required to separate the polyvinyl alcohol-based film and the polymer film is much weaker than that of the case in which the films are laminated using coating or co-extrusion, the two films may be easily separated without a separate process or equipment, and the polyvinyl alcohol-based film is minimally damaged during the separation process, thereby exhibiting an excellent optical performance.

As described above, in the case of the present invention, since the peel strength required to separate the polyvinyl alcohol-based film and the polymer film is much weaker than that of the case in which the films are laminated using coating or co-extrusion, the two films may be easily separated without a separate process or equipment, and the polyvinyl alcohol-based film is minimally damaged during the separation process, thereby exhibiting an excellent optical performance.

The thickness of the thin polarizer of the present invention prepared by the method as described above is 10 μm or less, preferably in a range of 1 μm to 10 μm, and more preferably in a range of 3 μm to 10 μm, which is very small. Accordingly, it is possible to make a polarizing plate and the like including the same thin and light.

Further, the thin polarizer of the present invention prepared by the method as described above exhibits excellent optical properties even with this small thickness, such as a single transmittance in a range of 40% to 43%, preferably 41.5% to 42%, and a degree of polarization of 99.0% or more, preferably 99.5% or more, and more preferably 99.8% or more.

In particular, the thin polarizer of the present invention prepared by the method as described above satisfies the following Equation (3). In general, the thin polarizer has optical properties that when the single transmittance is decreased, the degree of polarization is increased, and when the single transmittance is increased, the degree of polarization is decreased. Accordingly, there is a problem in that the thin polarizer fails to have high optical properties in terms of both the degree of polarization and the single transmittance. However, the thin polarizer according to the present invention may have high optical properties in terms of both the degree of polarization and the single transmittance by satisfying the following Equation (3).

$$DOP > -0.3179 Ts^2 + 26.012 Ts + 432.12 \quad \text{Equation (3):}$$

In Equation (3), DOP is a degree of polarization, Ts is a single transmittance, and in this case, Ts satisfies the relationship $0.400 < Ts < 0.427$.

Meanwhile, a polarizing plate may be formed by laminating a transparent film on one surface or both surfaces of the polarizer of the present invention as described above. In this case, the structure of the polarizing plate is not particularly limited as long as the polarizing plate includes the polarizer of the present invention, and may be, for example, a polarizer/a protective film, a protective film/a polarizer, or a protective film/a polarizer/a protective film, and the like.

In this case, the protective film is provided for supporting and protecting a polarizer, and protective films formed of various materials generally known in the art, for example, a cellulose-based film, a polyethylene terephthalate (PET) film, a cycloolefin polymer (COP) film, and an acryl-based film and the like may be used as the protective film without limitation. Among them, it is particularly preferred that an acryl-based film is used in consideration of optical properties, durability, economic efficiency and the like.

The method of laminating the polarizer and the protective film is not particularly limited, and may be performed by using an adhesive or a gluing agent, and the like well known in the art. In this case, the gluing agent or the adhesive may be appropriately selected in consideration of a material for the protective film used and the like, and for example, when TAC is used as the protective film, a water-based adhesive such as a polyvinyl alcohol-based adhesive may be used, and when an acrylic film or COP film and the like are used as a protective film, a photocurable or thermally curable adhesive such as an acryl-based adhesive and an epoxy-based adhesive may be used.

Meanwhile, the polarizing plate may also include a phase difference film for compensating the optical phase difference. In this case, the phase difference film which may be used in the present invention is not particularly limited, and a phase difference film generally used in the art may be used according to various liquid crystal modes.

Meanwhile, the polarizing plate according to the present invention may be included in various display devices. For example, the polarizing plate may be applied to various display devices such as a liquid crystal display device (LCD) and an organic light emitting device (OLED).

BEST MODE

Hereinafter, the present invention will be described in more detail with reference to specific examples.

Example 1

A laminate was formed by attaching an unstretched polyvinyl alcohol-based film (Nippon Synthetic Chemical Industry Co., Ltd., M2001 grade 20 μm PVA film) having a thickness of 20 μm and a modulus of 407 MPa to both surfaces of an unstretched thermoplastic polyurethane film having a thickness of 40 μm and a modulus of 908 MPa. Meanwhile, the thermoplastic polyurethane film is composed of a thermoplastic polyurethane resin prepared by reacting methylenediphenyl diisocyanate, 1,4-butanediol and adipic acid.

A dyeing process was performed on the laminate in an iodine solution at a concentration of 0.25 wt % and 25° C.

for 20 seconds. Thereafter, a stretched laminate was prepared by subjecting the laminate to a washing process in a boric acid 1.0 wt % solution at 25° C. for 15 seconds, and then uniaxially stretching the resulting laminate in a boric acid 2.0 wt % solution at 52° C. and a stretching ratio of 6.0 times in the MD direction.

After the stretching, the laminate was subjected to adding complementary colors in a 5 wt % potassium iodide (KI) solution, and then a drying process was performed at 80° C. in an oven for 5 minutes. After the drying process, a polyvinyl alcohol-based thin polarizer having a thickness of 6.2 µm was finally prepared by peeling off the polyvinyl alcohol-based film from the polymer film.

Example 2

A polyvinyl alcohol-based thin polarizer having a thickness of 6.8 µm was prepared in the same manner as in Example 1, except that a laminate was formed by attaching an unstretched polyvinyl alcohol-based film (Nippon Synthetic Chemical Industry Co., Ltd., M2001 grade 20 µm PVA film) having a thickness of 20 µm and a modulus of 407 MPa to both surfaces of an unstretched thermoplastic polyurethane film having a thickness of 40 µm and a modulus of 956 MPa.

Example 3

A polyvinyl alcohol-based thin polarizer having a thickness of 6.1 µm was prepared in the same manner as in Example 1, except that a laminate was formed by attaching an unstretched polyvinyl alcohol-based film (Nippon Synthetic Chemical Industry Co., Ltd., M2001 grade 20 µm PVA film) having a thickness of 20 µm and a modulus of 407 MPa to both surfaces of an unstretched thermoplastic polyurethane film having a thickness of 60 µm and a modulus of 1064 MPa.

Comparative Example 1

A polyvinyl alcohol-based thin polarizer having a thickness of 5.3 µm was prepared in the same manner as in Example 1, except that a laminate was formed by attaching an unstretched polyvinyl alcohol-based film (Nippon Synthetic Chemical Industry Co., Ltd., M2000 grade 20 µm PVA film) having a thickness of 20 µm and a modulus of 1781 MPa to both surfaces of an unstretched thermoplastic polyurethane film having a thickness of 40 µm and a modulus of 908 MPa, and then dyeing was performed by immersing the laminate in a dyeing solution for 15 seconds.

Comparative Example 2

A polyvinyl alcohol-based thin polarizer having a thickness of 5.3 µm was prepared in the same manner as in Example 1, except that a laminate was formed by attaching an unstretched polyvinyl alcohol-based film (Nippon Synthetic Chemical Industry Co., Ltd., M2000 grade 20 µm PVA film) having a thickness of 20 µm and a modulus of 1781 MPa to both surfaces of an unstretched thermoplastic polyurethane film having a thickness of 40 µm and a modulus of 908 MPa.

Comparative Example 3

A polyvinyl alcohol-based thin polarizer having a thickness of 5.3 µm was prepared in the same manner as in Example 1, except that a laminate was formed by attaching an unstretched polyvinyl alcohol-based film (Nippon Synthetic Chemical Industry Co., Ltd., M2000 grade 20 µm PVA film) having a thickness of 20 µm and a modulus of 1781 MPa to both surfaces of an unstretched thermoplastic polyurethane film having a thickness of 40 µm and a modulus of 908 MPa, and then dyeing was performed by immersing the laminate in a dyeing solution for 25 seconds.

Comparative Example 4

A polyvinyl alcohol-based thin polarizer having a thickness of 5.3 µm was prepared in the same manner as in Example 1, except that a laminate was formed by attaching an unstretched polyvinyl alcohol-based film (Nippon Synthetic Chemical Industry Co., Ltd., M2000 grade 20 µm PVA film) having a thickness of 20 µm and a modulus of 1781 MPa to both surfaces of an unstretched thermoplastic polyurethane film having a thickness of 40 µm and a modulus of 908 MPa, and then dyeing was performed by immersing the laminate in a dyeing solution for 30 seconds.

Comparative Example 5

A polyvinyl alcohol-based thin polarizer having a thickness of 4.9 µm was prepared in the same manner as in Example 1, except that a laminate was formed by attaching an unstretched polyvinyl alcohol-based film (Nippon Synthetic Chemical Industry Co., Ltd., M2000 grade 20 µm PVA film) having a thickness of 20 µm and a modulus of 1781 MPa to both surfaces of an unstretched thermoplastic polyurethane film having a thickness of 60 µm and a modulus of 1064 MPa.

Comparative Example 6

A polyvinyl alcohol-based thin polarizer having a thickness of 5.8 µm was prepared in the same manner as in Example 1, except that a laminate was formed by attaching an unstretched polyvinyl alcohol-based film (Nippon Synthetic Chemical Industry Co., Ltd., M2001 grade 20 µm PVA film) having a thickness of 20 µm and a modulus of 407 MPa to both surfaces of an unstretched polyproylene film having a thickness of 50 µm and a modulus of 200 MPa (R&F Co., Ltd., MPL).

Experimental Example 1—Measurement of
Physical Properties of Unstretched Polymer Film
and Polyvinyl Alcohol-Based Film It was measured whether the unstretched polymer film and the polyvinyl alcohol-based film used in Examples 1 and 2 and Comparative Examples 1 to 6 satisfied Equations (1) and (2) of the present invention, and the results are shown in the following [Table 1]. In this case, the modulus was measured by using a tensile strength meter (Zwick/Roell 2010 UTM), and the thickness was measured by using a thickness measurement device (TESA Mu-bite Electronic Height Gauge 100 mm).

TABLE 1

| Classification | $E_{sub'}/d_{sub'}$ | $E_{PVA}/d_{PVA}$ | $(E_{PVA}/d_{PVA})/(E_{sub'}/d_{sub'})$ |
|---|---|---|---|
| Example 1 | 22.7 | 20.4 | 0.896 |
| Example 2 | 23.9 | 20.4 | 0.851 |
| Example 3 | 17.7 | 20.4 | 1.148 |

TABLE 1-continued

| Classification | $E_{sub'}/d_{sub'}$ | $E_{PVA}/d_{PVA}$ | $(E_{PVA}/d_{PVA})/(E_{sub'}/d_{sub'})$ |
|---|---|---|---|
| Comparative Example 1 | 22.7 | 89.1 | 3.923 |
| Comparative Example 2 | 22.7 | 89.1 | 3.923 |
| Comparative Example 3 | 22.7 | 89.1 | 3.923 |
| Comparative Example 4 | 22.7 | 89.1 | 3.923 |
| Comparative Example 5 | 17.7 | 89.1 | 5.022 |
| Comparative Example 6 | 4.0 | 20.4 | 5.103 |

In [Table 1], $E_{sub'}$ is the modulus of an unstretched polymer film, $d_{sub'}$ is the thickness of the unstretched polymer film, $E_{PVA}$ is a modulus of an unstretched polyvinyl alcohol-based film, and $d_{PVA}$ is the thickness of the unstretched polyvinyl alcohol-based film.

As shown in the [Table 1], it can be seen that Examples 1 to 3 satisfy both Equations (1) and (2) of the present invention, but Comparative Examples 1 to 5 fail to satisfy Equation (2), and Comparative Example 6 fails to satisfy both Equations (1) and (2).

Experimental Example 2—Measurement of Optical Properties

In Examples 1 to 3 and Comparative Examples 1 to 6, optical properties of the prepared thin polarizers were measured by JASCO V-7100 Spectrophotometer, and are shown in the following [Table 2]. Furthermore, in Examples 1 to 3 and Comparative Examples 1 to 6, a graph showing the relationship between the single transmittance and the degree of polarization of the prepared thin polarizer is shown in the following FIG. 2.

TABLE 2

| Classification | Thickness (μm) | Single transmittance (%) | Degree of polarization (%) | Single color a | Single color b | Orthogonal color a | Orthogonal color b |
|---|---|---|---|---|---|---|---|
| Example 1 | 6.2 | 41.79 | 99.8617 | 0.24 | 2.11 | 2.70 | −0.33 |
| Example 2 | 6.8 | 41.60 | 99.8571 | 0.51 | 2.34 | 3.38 | 0.15 |
| Example 3 | 6.1 | 41.89 | 99.6463 | 0.04 | 1.96 | 2.30 | −2.07 |
| Comparative Example 1 | 5.3 | 42.03 | 99.5244 | 0.46 | 2.49 | 4.54 | 0.80 |
| Comparative Example 2 | 5.3 | 41.70 | 99.7222 | 0.19 | 1.91 | 2.90 | −0.96 |
| Comparative Example 3 | 5.3 | 41.59 | 99.7801 | 0.53 | 1.98 | 3.54 | −0.23 |
| Comparative Example 4 | 5.3 | 41.30 | 99.8753 | 0.12 | 1.80 | 2.43 | −1.81 |
| Comparative Example 5 | 4.9 | 41.20 | 99.7127 | 0.41 | 1.45 | 3.30 | −2.20 |
| Comparative Example 6 | 5.8 | 41.67 | 99.5762 | 0.80 | 2.99 | 6.26 | 2.05 |

In [Table 2], the single transmittance refers to a transmittance of a single polarizer. The degree of polarization refers to $[(Tp-Tc)/(Tp+Tc)]^{0.5}$, Tp refers to a parallel transmittance of two polarizing plates, and Tc refers to an orthogonal transmittance of two polarizing plates.

Further, the single color and the orthogonal color in the single colors a and b and the orthogonal colors a and b values denote values obtained by measuring the color of a single polarizer using a color difference meter and values obtained by measuring the color using a color difference meter when a pair of polarizers are disposed in a state where the absorption axes are orthogonal to each other, respectively.

In addition, the colors a and b refer to values which express the color in the CIE coordinate system, and more specifically, the color a value is calculated as $a=500[(X/Xn)^{1/3}-(Y/Yn)^{1/3}]$, and +a and −a mean red and green, respectively. Furthermore, the color b value is calculated as $b=200[(Y/Yn)^{1/3}-(Z/Zn)^{1/3}]$, and +b and −b mean yellow and blue, respectively. (Here, Xn, Yn and Zn correspond to X, Y and Z of the reference white color.)

That is, the single color a and b values refer to the color a and b values in the CIE coordinate system, in which a single polarizer color is measured using a color difference meter, and the orthogonal colors a and b values denote color a and b values in the CIE coordinate system by measuring the color using a color difference meter when a pair of polarizers are disposed in a state where the absorption axes are orthogonal to each other, respectively.

Figure 2:
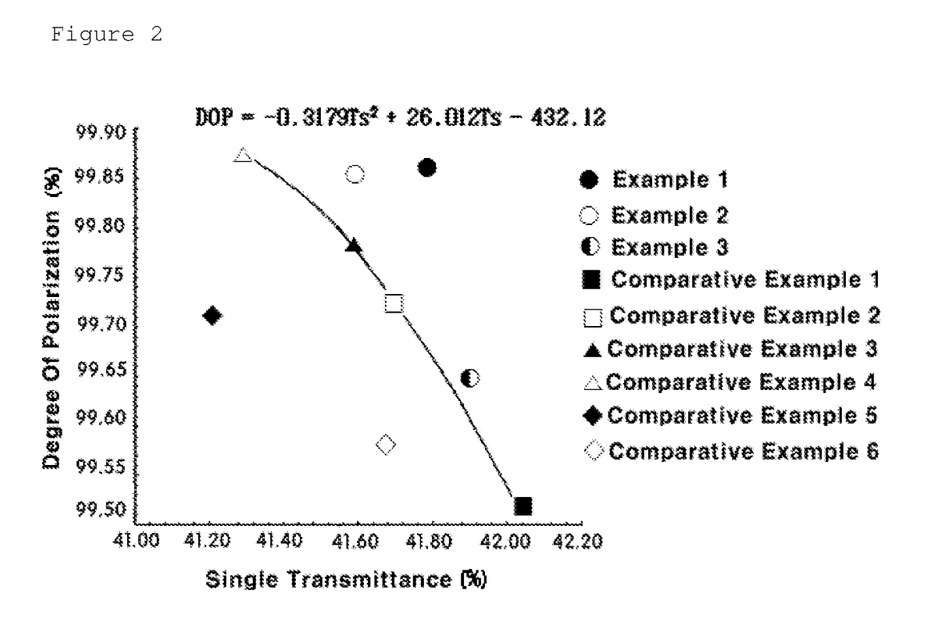
FIG. 2 is a graph showing the relationship between single transmittance ($T_s$) and degree of polarization (DOP) of the thin polarizers prepared in Examples 1 to 3 and Comparative Examples 1 to 6.

As shown in [Table 2] and the following FIG. 2, it can be seen that the thin polarizers prepared by the preparation methods in Examples 1 to 3 have an excellent degree of polarization of 99.8% or more even when the single transmittance is high, such as in a range of 41.5% to 42.0%, unlike the thin polarizers prepared by the preparation methods in Comparative Examples 1 to 6, and through this, a thin polarizer, which is excellent in both single transmittance and degree of polarization, may be prepared according to the present invention.

As described above, exemplary embodiments of the present invention have been described in detail, but it will be obvious to a person with ordinary skill in the art that the scope of the present invention is not limited thereto, and various modifications and changes may be made without departing from the technical spirit of the present invention described in the claims.

EXPLANATION OF REFERENCE NUMERALS AND SYMBOLS

H: Holder
A: Polyvinyl alcohol-based film
B: Polymer film
MD: Longitudinal stretching direction
DOP: Degree of polarization
Ts: Single transmittance

The invention claimed is:
1. A laminate comprising:
an unstretched polymer film; and
an unstretched polyvinyl alcohol-based film attached to at least one surface of the polymer film,
wherein the laminate satisfies the following Equations (1) and (2):

$$5 \leq \frac{E_{sub'}}{d_{sub'}} \leq 70 \quad \text{Equation (1)}$$

$$0.7 \leq \frac{\left(\frac{E_{PVA}}{d_{PVA}}\right)}{\left(\frac{E_{sub'}}{d_{sub'}}\right)} \leq 1.3 \quad \text{Equation (2)}$$

in Equations (1) and (2), $E_{sub'}$ is a modulus of a polymer film, $d_{sub'}$ is a thickness of the polymer film, $E_{PVA}$ is a modulus of a polyvinyl alcohol-based film, and $d_{PVA}$ is a thickness of the polyvinyl alcohol-based film, wherein the modulus of the polymer film is 50 MPa to 4,000 MPa, and the thickness is 20 μm to 100 μm, wherein the modulus of the polyvinyl alcohol-based film is 50 MPa to 4,000 MPa, and the thickness is 10 μm to 60 μm, and wherein the unstretched polymer film comprises a thermoplastic polyurethane-based resin.

2. A stretched laminate prepared by stretching the laminate of claim 1 by 5 to 15 times at a temperature of 20° C. to 85° C.

3. A thin polarizer comprising the stretched laminate of claim 2, having a thickness of 10 μm or less, and satisfying the following Equation (3):

$$DOP > -0.3179 Ts^2 + 26.012 Ts - 432.12 \qquad \text{Equation (3)}$$

in Equation (3), DOP is a degree of polarization, Ts is a single transmittance, and in this case, Ts satisfies a relationship $40.0 < Ts < 42.7$.

4. A polarizing plate comprising the thin polarizer of claim 3.

5. A preparing method for a thin polarizer, the method comprising:

forming a laminate which satisfies the following Equations (1) and (2) by attaching an unstretched polyvinyl alcohol-based film to at least one surface of an unstretched polymer film; and forming a stretched laminate by stretching the laminate:

$$5 \leq \frac{E_{sub'}}{d_{sub'}} \leq 70 \qquad \text{Equation (1)}$$

$$0.7 \leq \frac{\left(\frac{E_{PVA}}{d_{PVA}}\right)}{\left(\frac{E_{sub'}}{d_{sub'}}\right)} \leq 1.3 \qquad \text{Equation (2)}$$

in Equations (1) and (2), $E_{sub'}$ is the modulus of a polymer film, $d_{sub'}$ is the thickness of the polymer film, $E_{PVA}$ is the modulus of a polyvinyl alcohol-based film, and $d_{PVA}$ is the thickness of the polyvinyl alcohol-based film, wherein the modulus of the polymer film is 50 MPa to 4,000 MPa, and the thickness is 20 μm to 100 μm, wherein the modulus of the polyvinyl alcohol-based film is 50 MPa to 4,000 MPa, and the thickness is 10 μm to 60 μm, and wherein the unstretched polymer film comprises a thermoplastic polyurethane-based resin.

6. The method of claim 5, wherein the polymer film and the polyvinyl alcohol-based film are attached to each other by using a weak attractive force on the surfaces of the films or an adhesive.

7. The method of claim 5, wherein the stretching is performed at a stretching ratio of 5 times to 15 times at a temperature of 20° C. to 85° C.

8. The method of claim 5, wherein the stretching is performed in a boric acid aqueous solution at a boric acid concentration of 1 wt % to 5 wt %.

9. The method of claim 5, further comprising:

dyeing at least one of iodine and a dichroic dye to the laminate prior to the forming of the stretched laminate.

10. The method of claim 5, further comprising:

separating the polyvinyl alcohol-based film from the polymer film after the forming of the stretched laminate.

11. The method of claim 10, wherein the separating of the polyvinyl alcohol-based film from the polymer film is performed by applying a peel strength of 2 N/2 cm or less.

* * * * *